(12) United States Patent
Huang et al.

(10) Patent No.: US 10,423,978 B2
(45) Date of Patent: Sep. 24, 2019

(54) METHOD AND DEVICE FOR PLAYING ADVERTISEMENTS BASED ON RELATIONSHIP INFORMATION BETWEEN VIEWERS

(71) Applicant: SAMSUNG ELECTRONICS CO., LTD., Suwon-si (KR)

(72) Inventors: Ying Huang, Beijing (CN); Junjun Xiong, Beijing (CN); Yanjun Gao, Beijing (CN); Chao Yan, Beijing (CN); Qiang Wang, Beijing (CN); Yaqin Qiu, Beijing (CN); Yan Chen, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 530 days.

(21) Appl. No.: 14/808,597

(22) Filed: Jul. 24, 2015

(65) Prior Publication Data

US 2016/0027046 A1    Jan. 28, 2016

(30) Foreign Application Priority Data

Jul. 24, 2014  (CN) .............................. 201410356198
Jun. 16, 2015  (KR) ........................ 10-2015-0085142

(51) Int. Cl.
*G06Q 30/02*  (2012.01)
(52) U.S. Cl.
CPC ..... *G06Q 30/0251* (2013.01); *G06Q 30/0201* (2013.01); *G06Q 30/0252* (2013.01); *G06Q 30/0269* (2013.01)

(58) Field of Classification Search
CPC ........... G06Q 30/0201; G06Q 30/0251; G06Q 30/0269; G06Q 30/0252
See application file for complete search history.

(56) References Cited

U.S. PATENT DOCUMENTS

| | | | | |
|---|---|---|---|---|
| 5,420,606 A | * | 5/1995 | Begum | ................ G06Q 20/387 235/382.5 |
| 8,005,057 B2 | * | 8/2011 | Lim | ................... G06Q 30/0261 370/338 |
| 8,442,429 B2 | * | 5/2013 | Hawit | ................ H04M 3/4878 455/3.06 |
| 8,775,252 B2 | * | 7/2014 | Wu | ........................ G06Q 30/02 705/14.43 |
| 8,881,188 B2 | * | 11/2014 | Kubota | .................. G06Q 30/02 705/14.37 |

(Continued)

FOREIGN PATENT DOCUMENTS

CN    101901571 A    12/2010

OTHER PUBLICATIONS

Communication dated Nov. 11, 2015, issued by the European Patent Office in counterpart European Application No. 15178006.1.

(Continued)

*Primary Examiner* — Raquel Alvarez
(74) *Attorney, Agent, or Firm* — Sughrue Mion, PLLC

(57) ABSTRACT

A method of playing advertisements according to exemplary embodiments includes collecting data of at least two viewers near a display, extracting relationship information of the at least two viewers based on the data, determining advertisements to play on the display according to the relationship information, and playing the determined advertisements on the display.

20 Claims, 19 Drawing Sheets

(56) References Cited

U.S. PATENT DOCUMENTS

| | | | |
|---|---|---|---|
| 9,843,918 B2* | 12/2017 | Luo | H04W 8/005 |
| 2003/0126013 A1* | 7/2003 | Shand | G06Q 30/02 |
| | | | 705/14.52 |
| 2007/0136745 A1 | 6/2007 | Garbow et al. | |
| 2009/0060256 A1 | 3/2009 | White et al. | |
| 2009/0061764 A1* | 3/2009 | Lockhart | G06F 17/30017 |
| | | | 455/3.06 |
| 2009/0177528 A1 | 7/2009 | Wu et al. | |
| 2010/0122286 A1 | 5/2010 | Begeja et al. | |
| 2012/0130822 A1* | 5/2012 | Patwa | G06Q 30/0273 |
| | | | 705/14.69 |
| 2013/0290108 A1 | 10/2013 | Machado et al. | |
| 2014/0365303 A1* | 12/2014 | Vaithilingam | G06Q 30/0256 |
| | | | 705/14.54 |
| 2015/0046267 A1* | 2/2015 | MacTiernan | H04L 51/32 |
| | | | 705/14.66 |
| 2015/0120422 A1* | 4/2015 | Deshpande | G06Q 30/0224 |
| | | | 705/14.25 |
| 2015/0324850 A1* | 11/2015 | Rivera | G06Q 30/0267 |
| | | | 705/14.58 |
| 2017/0359569 A1* | 12/2017 | Stafford | G06F 3/017 |

OTHER PUBLICATIONS

Office Action dated Nov. 6, 2018 by the State Intellectual Proeprty Office of P.R. China in counterpart Chinese Patent Application No. 201410356198.7.

* cited by examiner

METHOD AND DEVICE FOR PLAYING ADVERTISEMENTS BASED ON RELATIONSHIP INFORMATION BETWEEN VIEWERS

CROSS-REFERENCE TO RELATED APPLICATIONS

This application claims the benefit of Korean Patent Application No. 10-2015-0085142, filed on Jun. 16, 2015, in the Korean Intellectual Property Office, and Chinese Patent Application No. 201410356198.7, filed on Jul. 24, 2014, the disclosures of which are incorporated herein in their entirety by reference.

BACKGROUND

1. Field

The present disclosure relates to methods and devices for playing advertisements.

2. Description of the Related Art

As a new concept of media, digital signage is a digital display board that provides business, finance, entertainment, and other information with a large screen in large-scale shopping malls, supermarkets, restaurants, movie theaters, or other public places where people gather. The digital signage aims to provide information to people in a specific category at a specific physical place during a specific period of time so as to obtain advertisement effects. Recently, along with the development of human-computer interaction techniques, computer vision and artificial intelligence are starting to have an increasingly important role in information acquisition, collection, and monitoring, human-computer interaction interface design, and other aspects.

SUMMARY

Provided are a method and device for playing advertisements.

Additional aspects will be set forth in part in the description which follows and, in part, will be apparent from the description, or may be learned by practice of the presented exemplary embodiments.

According to an aspect of an exemplary embodiment, a method of playing advertisements includes collecting data of at least two viewers near a display, extracting relationship information of the at least two viewers based on the data, determining advertisements to play on the display according to the relationship information, and playing the determined advertisements on the display.

The collecting of the data may include collecting the data via a camera or a microphone, and the camera may include at least one selected from a visible light camera, a depth camera, and an infrared camera.

Also, the camera may capture images of the at least two viewers, and the microphone may record voices of the at least two viewers.

The extracting of the relationship information may include extracting body features or voice features of the at least two viewers from the data.

The body features of the at least two viewers may include at least one selected from a distance between the at least two viewers, face features of the at least two viewers, and body related information of the at least two viewers.

The face features of the at least two viewers may include at least one selected from the number of faces, features of the facial organs, face skin color, age, gender, viewpoints, and facial accessories.

The body related information of the at least two viewers may include at least one selected from the number of bodies, features of body parts, movements of the bodies, hairstyle, clothing, body shapes, and carried items.

Also, the voice features of the at least two viewers may include at least one of a language type, voice content, and a voice source.

The extracting of the relationship information may include determining whether a relationship between the at least two viewers is family, friends, or colleagues.

The extracting of the relationship information may include extracting at least one piece of information from gender, age, skin color, hairstyle, clothing, body shapes, facial accessories, and carried items of the at least two viewers.

The collecting of the data may include collecting data of at least two viewers in front of the display.

The method may further include storing personal information of the at least two viewers in advance. The extracting of the relationship information may include searching for personal information that matches with the data from among the personal information, and extracting, based on the personal information that matches with the data, the relationship information between the at least two viewers.

According to an aspect of another exemplary embodiment, a device for playing advertisements includes a display configured to display the advertisements, an input unit configured to collect data of the at least two viewers near the display, and a processor configured to extract relationship information of the at least two viewers based on the data, determine advertisements that correspond to the relationship information according to the relationship information, and control the display such that the display displays the determined advertisements.

The input unit may include a camera and a microphone, and the input unit is configured to collect data via the camera and the microphone, and the camera includes at least one selected from a visible light camera, a depth camera, and an infrared camera.

Also, the camera may be configured to capture images of the at least two viewers, and the microphone may be configured to record voices of the at least two viewers.

The processor may be configured to extract body features or voice features of the at least two viewers from the data, and may determine advertisements to play based on the body features and the voice features.

The body features of the at least two viewers may include at least one selected from a distance between the at least two viewers, face features of the at least two viewers, and body related information of the at least two viewers.

The face features of the at least two viewers may include at least one selected from the number of faces, features of the facial organs, face skin color, age, gender, viewpoints, and facial accessories.

The body related information of the at least two viewers may include at least one selected from the number of bodies, features of body parts, movements of the bodies, hairstyle, clothing, body shapes, and carried items.

Also, the voice features of the at least two viewers may include at least one of a language type, voice content, and a voice source.

The extracting of the relationship information may include determining whether a relationship between the at least two viewers is family, friends, or colleagues.

The extracting of the relationship information may include extracting at least one piece of information from gender, age, skin color, hairstyle, clothing, body shapes, facial accessories, and carried items of the at least two viewers.

The input unit may be configured to collect data of at least two viewers in front of the display.

The device may further include a memory that is configured to store personal information of the at least two viewers in advance. The processor may be configured to search for personal information that matches with the data from among the personal information, and may be configured to extract the relationship information between the at least two viewers based on the personal information that matches with the data.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Preferred embodiments of the present invention provide a device and method for playing advertisements in which the advertisement to be played is chosen based on a determination of the relationship between at least two viewers. By analyzing inputs from camera(s) and/or microphone(s), a determination is made of whether there exists a likelihood of a familial or social relationship between two viewers and, if so, what that relationship is likely to be. An advertisement can then be selected to be played based on the determination of the relationship or association between the two viewers.

Figure 1:
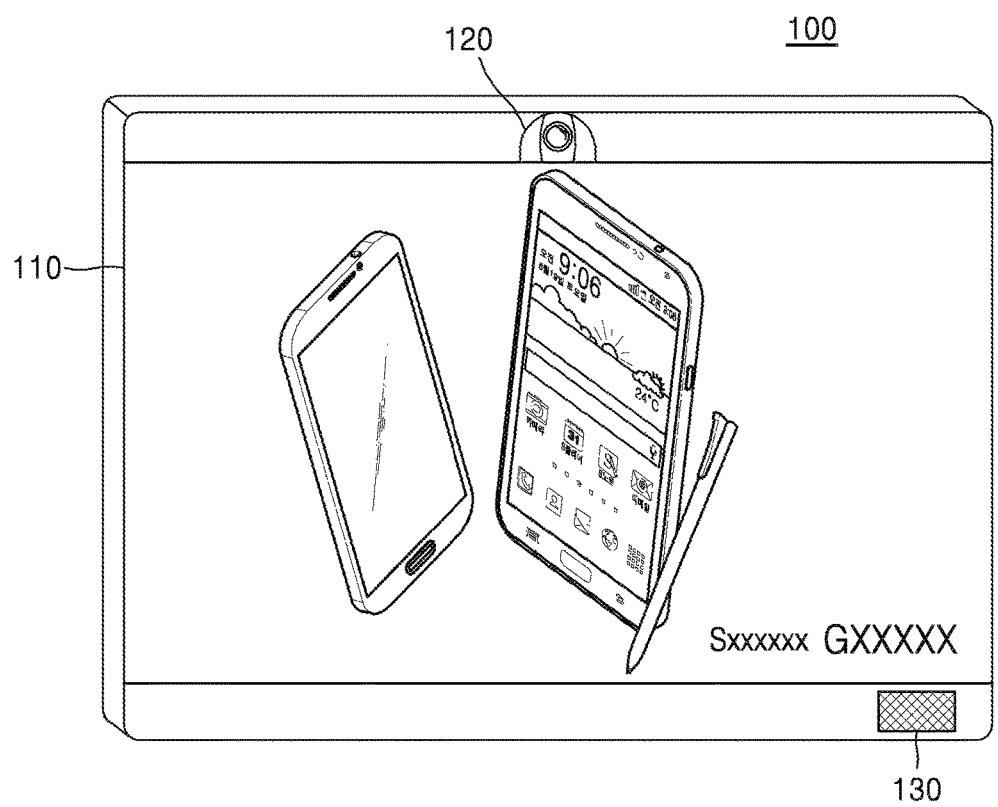
FIG. 1 is a diagram of a device for playing advertisements, according to an exemplary embodiment.

FIG. 1 is a diagram of a device for playing advertisements, according to an exemplary embodiment. Referring to FIG. 1, a device 100 includes a display 110, a camera 120, a microphone 130, and a processor (not shown). The device 100 may play advertisements to viewers in front of the display 110. The device 100 may be a device for playing advertisements. The camera 120 and the microphone 130 may be examples of an input unit.

The display 110 displays advertisements under the control of the processor.

The camera 120 captures images of viewers near the display 110. Alternatively, the camera 120 may capture the viewers in front of the display 110. The camera 120 may obtain visible light images, depth images, or infrared images. The camera 120 output obtained images to the processor.

The microphone 130 collects sounds around the display 110. Sounds include noise and voices of the viewers. The microphone 130 output the collected sounds to the processor.

The processor selects advertisements to be provided to the viewers based on data received from the camera 120 or the microphone 130. The processor may extract features of at least two viewers from the data, and extract relationship information between bodies according to the features. The features include at least one selected from a body feature, a voice feature, or a physiological feature. The body features of the at least two viewers include distance information of the at least two viewers, face related information of the at least two viewers, and body related information of the at least two viewers. The distance information includes a front and rear distance and/or a left and right distance. Specifically, the front and rear distance between the at least two viewers is determined by calculating distances from each of the at least two viewers to the display 110 according to depth information. The left and right distance between the at least two viewers is determined by calculating a distance between two body detection windows between the at least two viewers.

The processor detects faces of viewers in a captured image, and extracts face related information of at least two viewers from the detected faces. The face related information of the at least two viewers includes the number of faces, facial organ features, facial expression information, skin color, age, gender, viewpoints, and facial accessories.

The processor may identify a relationship between the viewers, and select which advertisement to play according to the identified relationship.

The processor may control the display 110 such that advertisements are displayed on the display 110.

The processor analyzes the data obtained via the camera 120 or the microphone 130 and determines whether the viewers are changed. When the viewers are changed, the processor may select advertisements that are appropriate for the changed viewers again and play the selected advertisements.

The device 100 may store personal information of the viewers in advance. For example, the device 100 may store captured images, obtained sounds, body related information, and voices in a memory. The device 100 may collect data related to the viewers near the display 110 and store the data in the memory. Alternatively, the device 100 may store information of the viewers in the memory in advance by a user.

The device 100 may identify the viewers by using the stored personal information. The device 100 may identify the viewers by comparing the stored personal information and collected personal information.

The device 100 may determine advertisements to be provided to the viewers by using the stored personal information. The device 100 may determine, in advance, advertisements that are appropriate for users along with ages, genders, body shapes, and family relationships of the viewers, and then store the advertisements. The device 100 may play advertisements that are determined with respect to the identified viewer.

Figure 2:
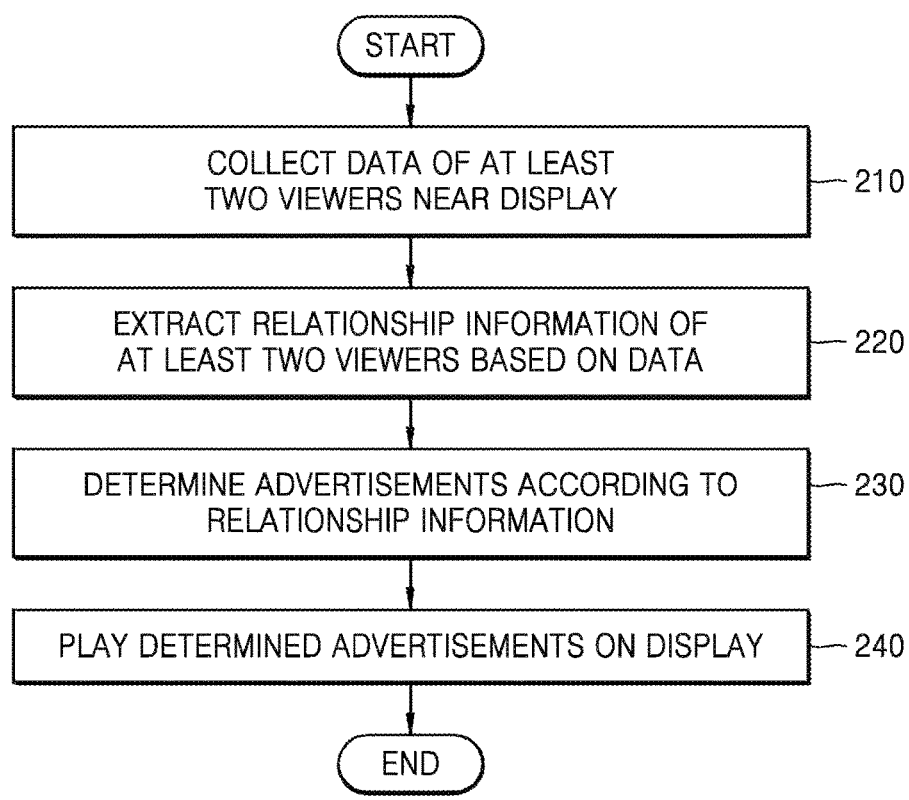
FIG. 2 is a flowchart of a method of playing advertisements, according to an exemplary embodiment.

FIG. 2 is a flowchart of a method of playing advertisements based on relationship information between viewers, according to an exemplary embodiment.

In operation 210, the device 100 collects data of at least two viewers near the display 110. The device 100 may collect the data by capturing images of the viewer in front of the display 110. The device 100 may collect the data of the viewers via the camera 120 or the microphone 130. The camera 120 may be a visible light camera, a depth camera, or an infrared camera. The microphone 130 receives sounds. The device 100 determines whether sounds include voices, and detect voices from the sounds. When the sounds include voices, the device 100 may filter noise from the sounds and extract voices from the sounds.

In operation 220, the device 100 extracts relationship information between the at least two viewers based on the data. The device 100 may estimate a relationship between the at least two viewers. For example, the device 100 may estimate that viewers are lovers, friends, colleagues, families or are unrelated based on a distance between the viewers, postures of the viewers, and conversation details of the viewers. The device 100 extracts features of the at least two viewers from the data, and the device 100 determines relationship information between the at least two viewers based on the extracted features. The features include at least one selected from body features, voice features, and physiological features.

The device 100 extracts body features of the at least two viewers from images captured by the camera 120. The body features of the at least two viewers include a distance between the at least two viewers, face information of the at least two viewers, and body information of the at least two viewers.

The device 100 determines the distance between the at least two viewers based on a captured image. The distance includes front and rear distance and/or a left and right distance. Specifically, the front and rear distance between the at least two viewers is determined by calculating distances from each of the at least two viewers to the display 110 according to depth information.

In operation 230, the device 100 determines advertisements according to the relationship information. For example, when viewers are lovers, the device 100 may determine advertisements of wallets, flowers, or clothes. When the viewers are friends, the device 100 may determine advertisements of travelling or food. When viewers are colleagues, the device 100 may determine advertisements of stationery or office supplies. When the viewers are families, the device 100 may determine advertisements of home appliances or furniture.

In operation 240, the device 100 plays the determined advertisements on the display 110. The processor may control the display 110 such that the device 100 plays the determined advertisements.

Figure 3:
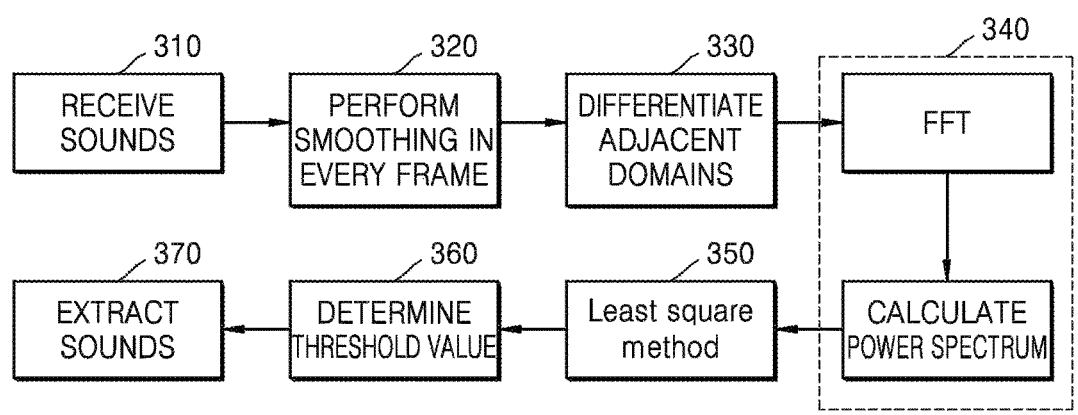
FIG. 3 is an exemplary diagram of voice detection.

FIG. 3 is a flowchart of a method of extracting voices, according to an exemplary embodiment. In operation 310, the device 100 collects sound information in front of the display 110 via the microphone 130. The device 100 performs extraction frame by frame to the sound information every 10 ms. In operation 320, the device 100 performs smoothing in every frame to extracted sounds. In operation 330, the device 100 calculates a maximum absolute difference within N domains by using a neighbor domain differential. In operation 340, the device 100 may filter noise from the sound information based on a fixed background noise model. For example, in order to obtain a converted power spectrum signal in operation 340, fast Fourier Transform (FFT) is performed on the sound information by using a predetermined coefficient N. In operation 350, the device 100 obtains a self-adaptive decision threshold by using the least square method. In operation 360, the device 100 determines a threshold value. Also, the device 100 determines that the sound information is voice information when the power spectrum signal is greater than the threshold value, and determines that the sound information is noise information when the power spectrum signal is less than the threshold value. In operation 370, when the determination result shows that the sound information includes voice information, the device 100 may filter noise and extract voice information from the sound information.

Figure 4:
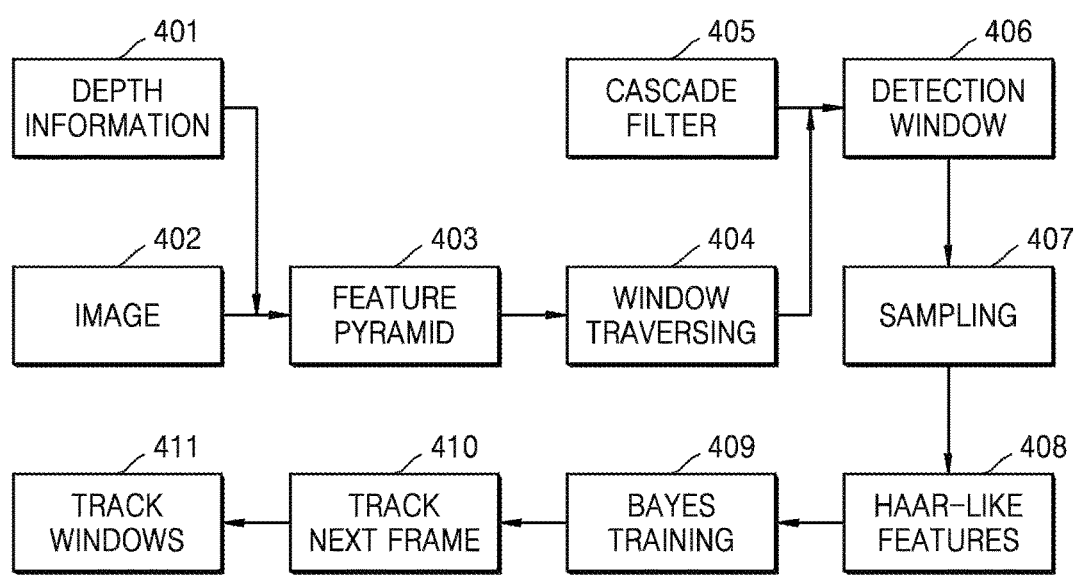
FIG. 4 is an exemplary diagram of face window detection.

FIG. 4 is an exemplary diagram of face window detection.

In operation 401, the device 100 filters a background image that does not belong to a face, according to depth information.

In operation 402, downsampling is performed on a visible light image at a predetermined ratio and a predetermined level. For example, downsampling is performed on an image at a ratio of 1.259.

In operation 403, a Random Local Assembly Block (RLAB) feature of each level is individually calculated by setting a 24-level image pyramid.

In operation 404, a feature image of each level is scanned by a window fixed to a size of 24*24 by window traversing.

In operation 405, a window image and an output response of a cascaded filter are calculated, and the calculation result is compared with a first training threshold.

In operation 406, when the calculation result is greater than the first training threshold, it is determined that a face is identified. When the calculation result is less than the first training threshold, it is determined that no face has been identified.

In operation 407, according to a size of a detection window, a background sample outside the detection window and a face sample within the detection window are collected.

In operation 408, Haar-like features of the background sample and the face sample are calculated.

In operation 409, a real-time online learning is performed by using a Bayes classifier.

In operation 410, tracking is performed by using an online model that is obtained by learning to obtain output face detection window information.

In operation 411, lastly, the number of faces is determined according to the number of face detection windows.

The device 100 performs face window detection according to visible light images and depth information to obtain face detection window information, and determines the number of faces according to the number of face detection windows. According to an embodiment, real-time face window detection may be performed by using RLAB and Adaboost according to the visible light images and the depth information.

Figure 5:
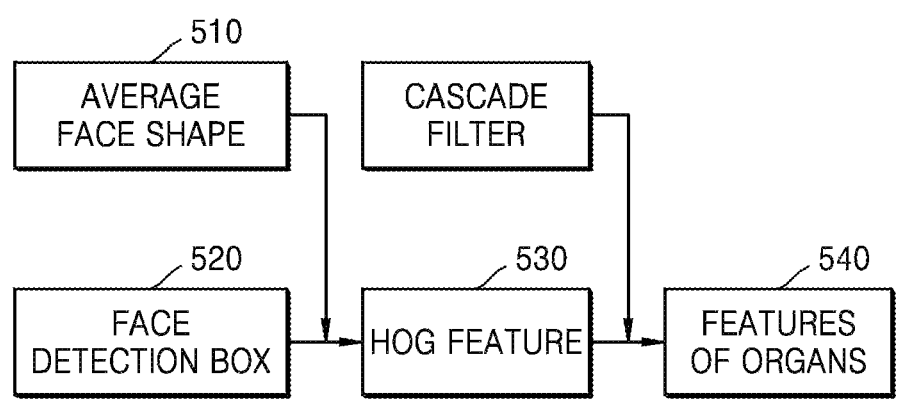
FIG. 5 is an exemplary diagram of searching for features of facial organs.

FIG. 5 is an exemplary diagram of searching for features of facial organs.

In operation 510, the device 100 searches for facial organs based on a face detection window to extract features of the facial organs. A facial organ search mainly includes searching for features of eyes, eyebrows, lips, nose, and ears.

The device 100 extracts face information by performing face detection according to image information. Face information of at least two viewers includes at least one selected from the number of faces, facial organ features, facial expressions, skin colors, ages, genders, directions of viewpoints, and facial accessories.

Face detection boxes 520 are normalized to an average face model size according to information of the face detection window, for example, an average shape face size of 64*64, a histogram of gradient (HOG) feature 530 of an average shape face in a face detection box, and iteration is performed by using a supervised descent method (SDM) obtained by training, and positions of feature points 540 of the facial organs are continuously updated to acquire the positions of the features points 540 of the facial organs.

The device 100 extracts facial texture feature information by performing face normalization and illumination normalization according to the information of the face detection window and the features of the facial organs. The device 100 determines, based on a machine learning algorithm, facial expression, skin color, age, and/or gender, according to the face texture information.

Figure 6:
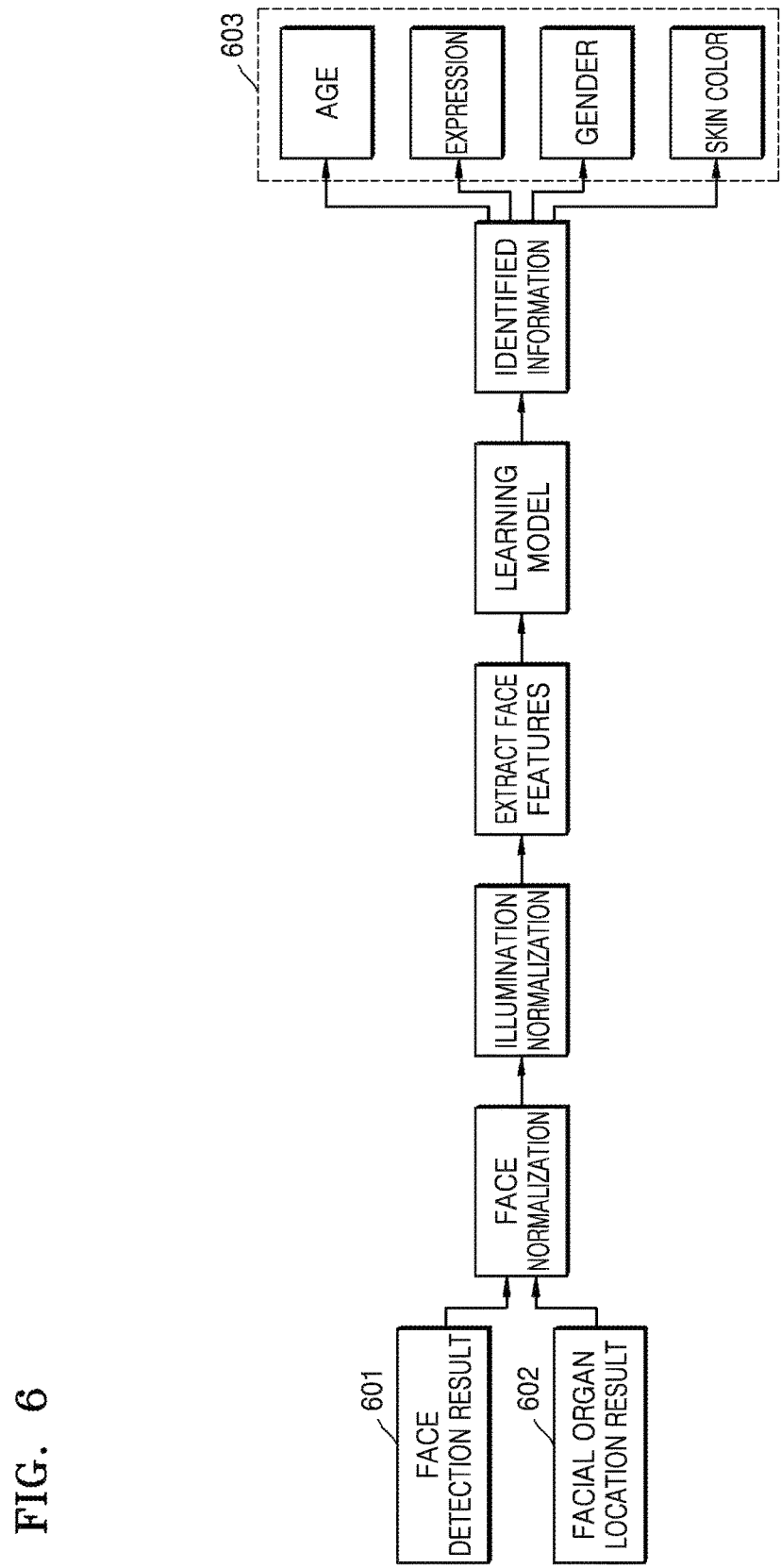
FIG. 6 is an exemplary diagram of identifying facial expression information, age information, gender information, and skin color information.

FIG. 6 is an exemplary diagram of identifying facial expression information, age information, gender information, and skin color information.

Face normalization and illumination normalization are performed according to features 602 of facial organs extracted by using information 601 of a face detection window obtained by face window detection as shown in FIG. 4 and a method of searching for the features of the facial organs shown in FIG. 5, so as to extract facial texture features, including but not limited to Gabor, SIFT, LBP, and HOG.

According to facial texture feature information, by training based on a machine learning algorithm such as SVM, DeepLearning, linear regression or other methods, facial expressions, ages, genders, and face skin colors 603 are identified and determined.

After extracting the features of the facial organs, the device 100 finds and calculates a viewpoint of eyes to determine a direction of the viewpoint. For example, first, a preset average face 3-dimensional (3D) model simulation is mapped into a face detection window obtained by face window detection so as to determine an affine 2D point. Next, a difference between locations of the features of the facial organs and the affine 2D point is calculated, a head pose angle is calculated by a gradient descent method, and the direction of the viewpoint is determined by using a method shown in FIG. 7 according to the head pose angle and a distance from the eyes to a screen.

Figure 7:
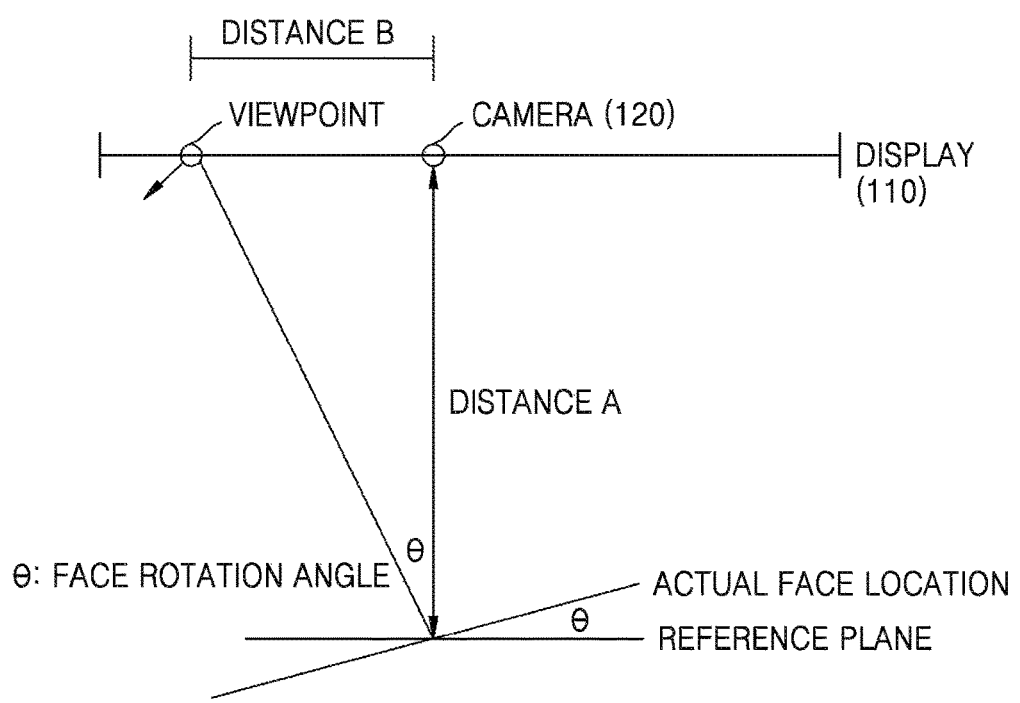
FIG. 7 is an exemplary diagram of calculating a viewpoint.

FIG. 7 is an exemplary diagram of calculating a viewpoint. In a right triangle shown in FIG. 7, it is known that a rotation angle of a head is θ and distance from a person to a screen is known as a distance 'a.' A distance b is calculated as a distance from a viewpoint on the screen to the center of the screen. The rotation angle θ of the head is divided into a horizontal angle and a vertical angle. According to the right triangle, offsets of two angles from the center of the screen may be calculated respectively in an x-direction and a y-direction. Lastly, offset distances in both of the x-direction and the y-direction are composed into one point. This point is the viewpoint. In order to calculate the distance from the person to the screen, faces of various people may be captured in different preset distances, for example, 25 cm, 50 cm . . . 1,500 cm, and an average size of the faces obtained from different distances is calculated. When a person is watching an advertisement, a distance from that person to the screen may be calculated based on a current face size, an average face size, and a corresponding distance relation.

Figure 8:
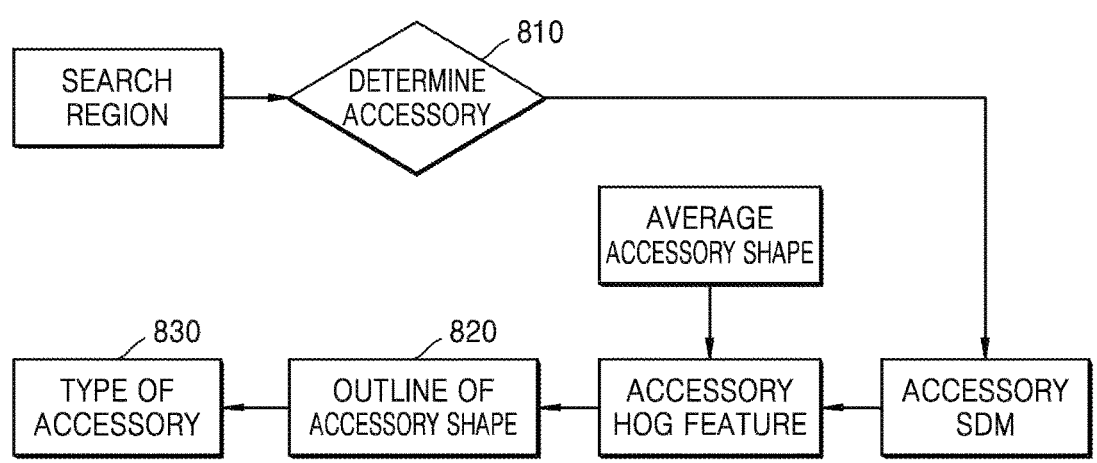
FIG. 8 is an exemplary diagram of detecting facial accessories.

FIG. 8 is an exemplary diagram of detecting facial accessories. After extracting the features of the facial organs, in operation 810, the device 100 may perform facial accessory detection on the features of the facial organs to determine facial accessory information. For example, glasses detection may be performed on an eye region, earrings detection may be performed on an ear region, and mask detection may be performed on lips.

An image sample of a region with accessories near the facial organ and an image sample of a region with no accessories near the facial organ are collected for texture feature extraction. The image samples are transferred to a machine learning frame to perform learning for modeling. Accessory detection is performed by using a model obtained by learning. When there is an accessory, a search for finding a profile of the accessory is performed to determine facial accessory information.

In operation 820, the device 100 identifies an outline of a shape of the accessory.

In operation 830, the device 100 determines a type of the accessory.

Figure 9:
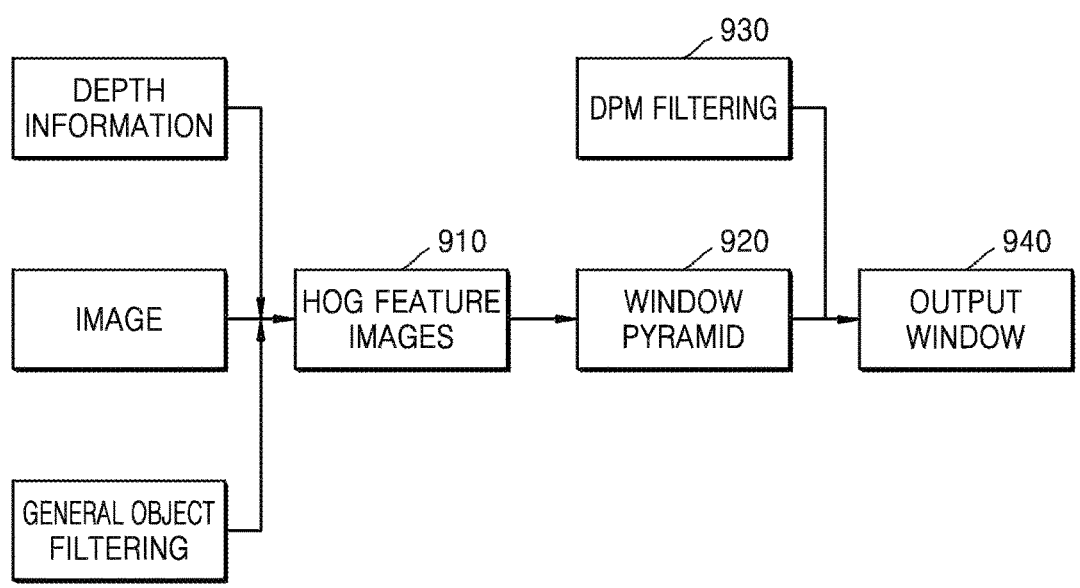
FIG. 9 is an exemplary diagram of body window detection.

FIG. 9 is an exemplary diagram of body window detection. The device 100 extracts body information of at least two viewers in each image by performing body detection. The body information of the at least two viewers include at least one selected from the number of bodies, features of body portions, behavior of bodies, hairstyles, clothes, body shapes, and carried items.

Specifically, the device 100 performs body window detection according to a visible light image and depth information to obtain the body detection window information, and determines the number of bodies according to the number of body detection windows. For example, according to the visible light image and image depth information, body detection may be performed in real time by using HOG and a deformable part model (DPM).

According to the visible light image and depth information of the image, body window detection is performed as shown in FIG. 9 to obtain the body detection window information. A left and right distance between the at least two viewers is determined by calculating a distance between body detection windows of the at least two viewers. Specific calculation processes are: based on a proportional relationship between pixels of the image and an actual distance, an actual left and right distance between two viewers is calculated and determined according to a space of pixels between body detection boxes of the two viewers shown in a visible light image.

Detection processes are shown in FIG. 9. The device 100 filters a background image that is not included in a body by using an image and depth information, and filters an object without a boundary by performing general object detection.

In operation 910, HOG feature images are obtained from the ged image.

In operation 920, a search window pyramid is set according to a certain ratio, a HOG feature image is searched, and a HOG feature image response in a DPM model and a window is calculated.

In operation 930, when a calculation result is greater than a second training threshold, the body detection window information is output according to a type of the DPM model.

In operation 940, the number of bodies is determined according to the number of body detection windows.

Figure 10:
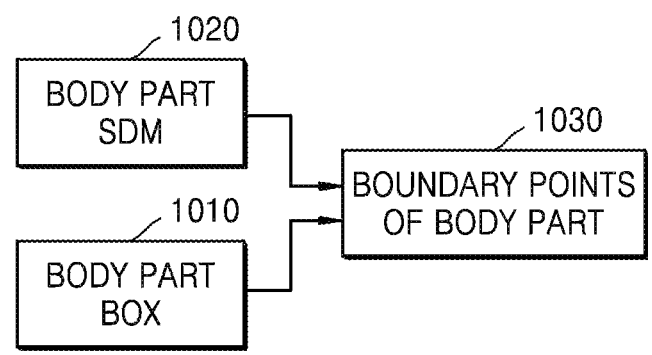
FIG. 10 is an exemplary diagram of identifying a location of a body part.

FIG. 10 is an exemplary diagram of identifying a location of a body part.

In operation 1010, the device 100 finds a body part according to the body detection window information to extract body part feature information. First, approximate locations of the head, shoulders, the torso, and other body parts are detected according to a deformable part model (DPM).

In operation 1020, by performing iteration by using an SDM model that is obtained by learning, a location of the body part is continuously updated for accurate locating, and thus, the location of the body part may be obtained. The SDM models of body parts are learned by using average normalization shapes of different sizes. For example, the head has an average normalization shape of 32*32, and a calf has an average normalization size of 60*10.

In operation 1030, the device 100 obtains boundary points of the body part by performing operation 910 and 920.

Figure 11:
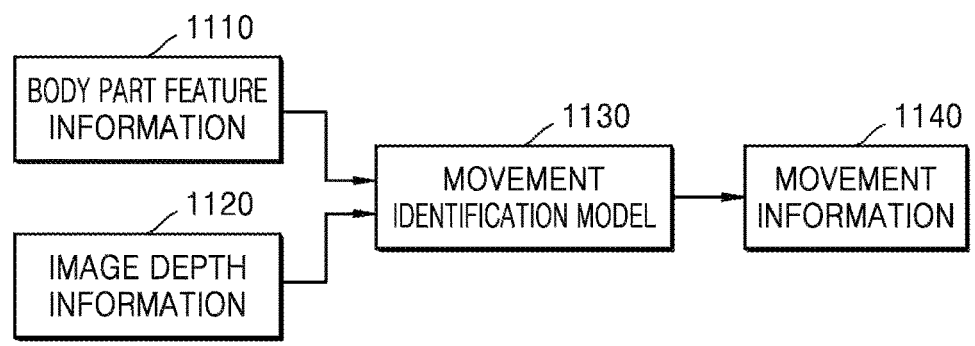
FIG. 11 is an exemplary diagram of movement information of a body.

FIG. 11 is an exemplary diagram of movement information of a body. The device 100 identifies movement information 1140 of the body by performing movement identification according to body part feature information 1110 and depth information 1120. As shown in FIG. 11, according to the body part feature information 1110 determined by finding the body part and the depth information, movements of the bodies such as holding hands, hugging shoulders, embracing, and the like are identified by using a movement identification model 1130.

Figure 12:
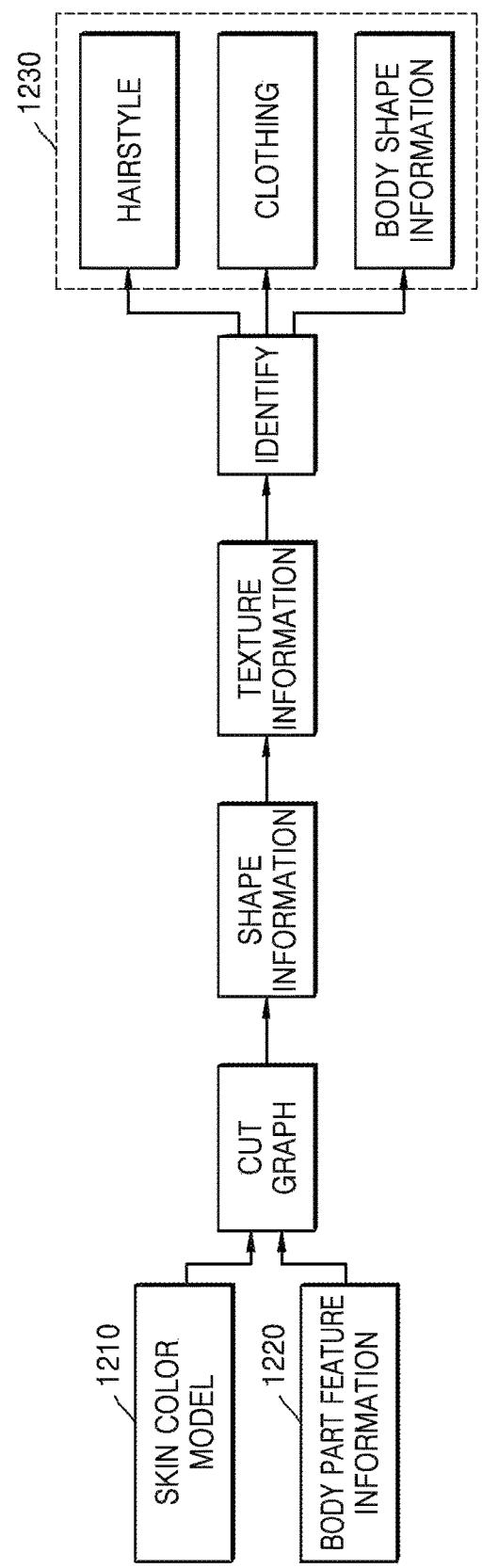
FIG. 12 is an exemplary diagram of identifying hairstyle information, clothing information, and body shape information.

FIG. 12 is an exemplary diagram of identifying hairstyle information, clothing information, and body shape information. The device 100 identifies hairstyle, clothing, and body shape information 1230 according to body parts and face skin colors to determine the hairstyle, the clothing, and the body shape information 1230.

According to body part feature information 1220 and a skin color model 1210, a found part is cut by using a GraphicCut technique, texture information and shape information of a cut region are extracted, and the hairstyle, the clothing, and the body shape information 1230 are identified and determined by using a model determined by machine learning.

The device 100 detects carried items in a predetermined area near a body detection window to determine information of the carried items. The carried items include pets, bags, books, mobile communication devices, and other carried items.

Figure 13:
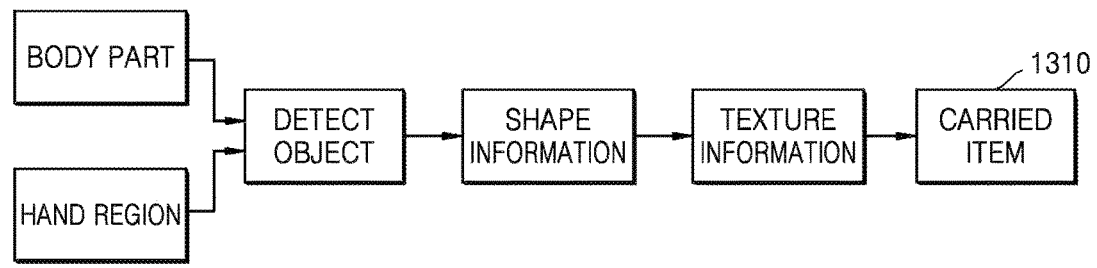
FIG. 13 is an exemplary diagram of identifying information of a carried item.

FIG. 13 is an exemplary diagram of identifying information of a carried item. An area near a hand is detected by using a DPM algorithm, and a carried item 1310 is classified in advance to identify pets, bags, mobile phones, tablet computers, and the like. For example, specific carried item information in a hand region, such as a type of a pet, or a color of a bag, is determined by using a mechanical learning algorithm such as DeepLearning. The device 100 detects an object in the hand region, and based on a shape of the object, determines which carried item corresponds to the object.

The device 100 extract physiological feature information of the at least two viewers from image information. The physiological feature information of the at least two viewers includes body temperature information. The device 100 determines a face skin color region and a body skin color region according to the body feature information, extracts infrared image information of the skin color region based on infrared image information by combining the face skin color region and the body skin color region, and according to infrared image grayscale information, determines the temperature information by linear regression.

Figure 14:
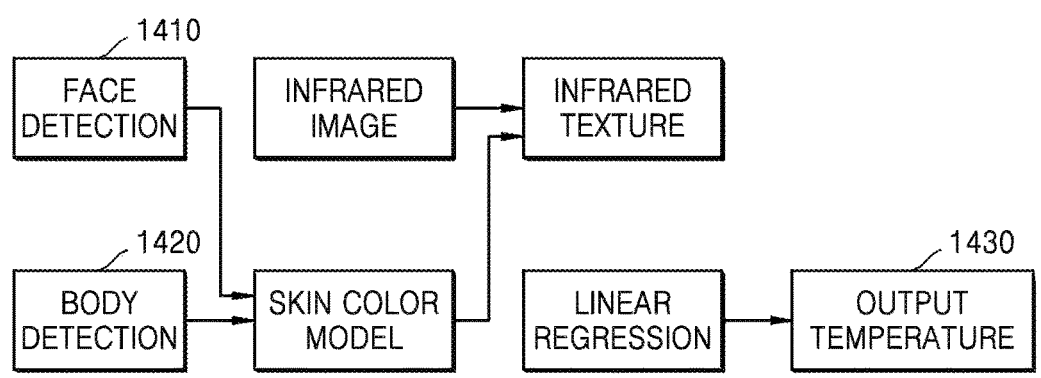
FIG. 14 is an exemplary diagram of identifying body temperature information.

FIG. 14 is an exemplary diagram of identifying body temperature information. Along with a result of detecting glasses and a mask as facial accessories, face detection window information determined by face detection 1410 and body detection window information determined by body detection 1420, a naked face skin color region and a body skin color region are detected by using a skin color model. A corresponding input infrared image region is searched to extract infrared image grayscale information of the skin color region, temperature information of a skin color region is calculated by linear regression. The deeper the color of the infrared image is, the higher the temperature is. The lighter the color of the infrared image is, the lower the temperature is. For example, a red region generally represents body temperature of a person, e.g., about 37° C., a yellow region represents about 20° C. to 28° C., and a blue region represents about 5° C. to 19° C. Linear regression is a statistic model for calculating temperature values that correspond to all color values of a skin region. Regions where the temperature values are mainly distributed are determined based on statistics, and body temperature values are determined based on main distribution regions of temperature. In an embodiment, whether a body has fever, flu, or other symptoms may be determined according to a shape of a mouth and voice information.

In operation 1430, the device 100 output the calculated temperature information.

Figure 15:
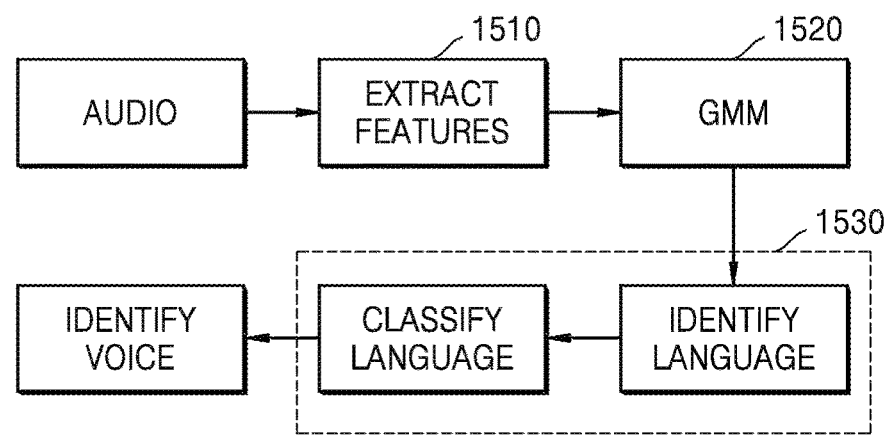
FIG. 15 is an exemplary diagram of identifying voice information.

FIG. 15 is an exemplary diagram of identifying voice information. The device 100 extracts voice feature information of at least two viewers from sounds. The voice feature information of the at least two viewers includes a language type, voice content, and a voice source.

The device 100 extracts voice information, acoustic feature information, and spectrum information, and identifies the acoustic feature information and the spectrum information by using a machine learning algorithm to determine a first level language type of the voice information. When the first level language type of the voice information is determined, the device 100 performs secondary classification and identification on the voice information based on the first level language type of the voice information, and determines a second level language type of the voice information. The second level language type of the voice information is included in the first level language type. Specifically, a process of identifying a language type for communication between bodies according to the voice information is as shown in FIG. 15.

In operation 1510, an acoustic feature and a spectrum feature of the voice information is extracted according to the voice information.

In operation 1520, a feature length is normalized by using a Gaussian mixture model (GMM).

In operation 1530, a language type (e.g. SVM, DeepLearning) is identified by using a machine learning algorithm, and the identified language type is further classified and identified. For example, when the language type is English, the language type is classified into British English and American English and identified. When the language type is Chinese, the language type is classified into Mandarin, dialect, etc. and identified.

The device 100 identifies voice content in the voice information by using a voice identification technique. Specifically, by using a voice identification technique such as HMM or DeepLearning, voice content is identified and key information of the voice content is extracted.

Figure 16:
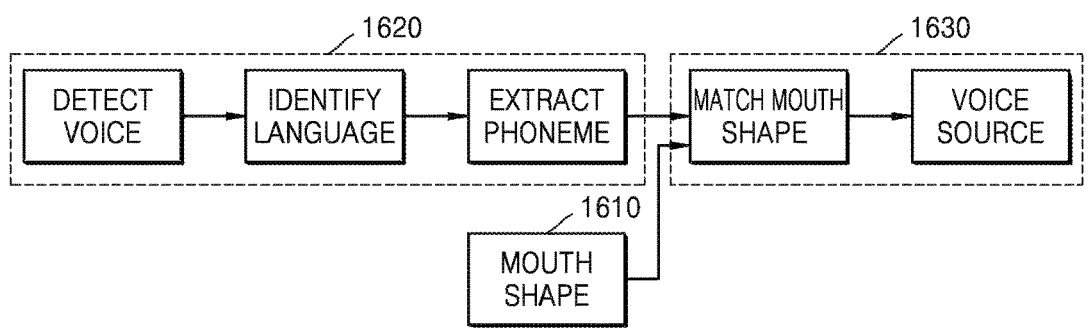
FIG. 16 is an exemplary diagram of finding a voice source.

The device 100 extracts a feature of a facial organ from an image, and finds a voice source of the voice information by performing mouth shape matching according to a language type and voice content, along with feature information of the mouth shape that is included in the feature of the facial organ. Specifically, a method of finding a voice source is as shown in FIG. 16.

In operation 1610, a mouth shape is determined by finding feature points of facial mouth organs as shown in FIG. 5.

In operation 1620, a language type and voice content are identified by using DeepLearning, as in the voice identification method shown in FIG. 15.

In operation 1630, along with the language type, the voice content, and a mouth shape, the device 100 finds a voice source by performing mouth shape matching.

Figure 17:
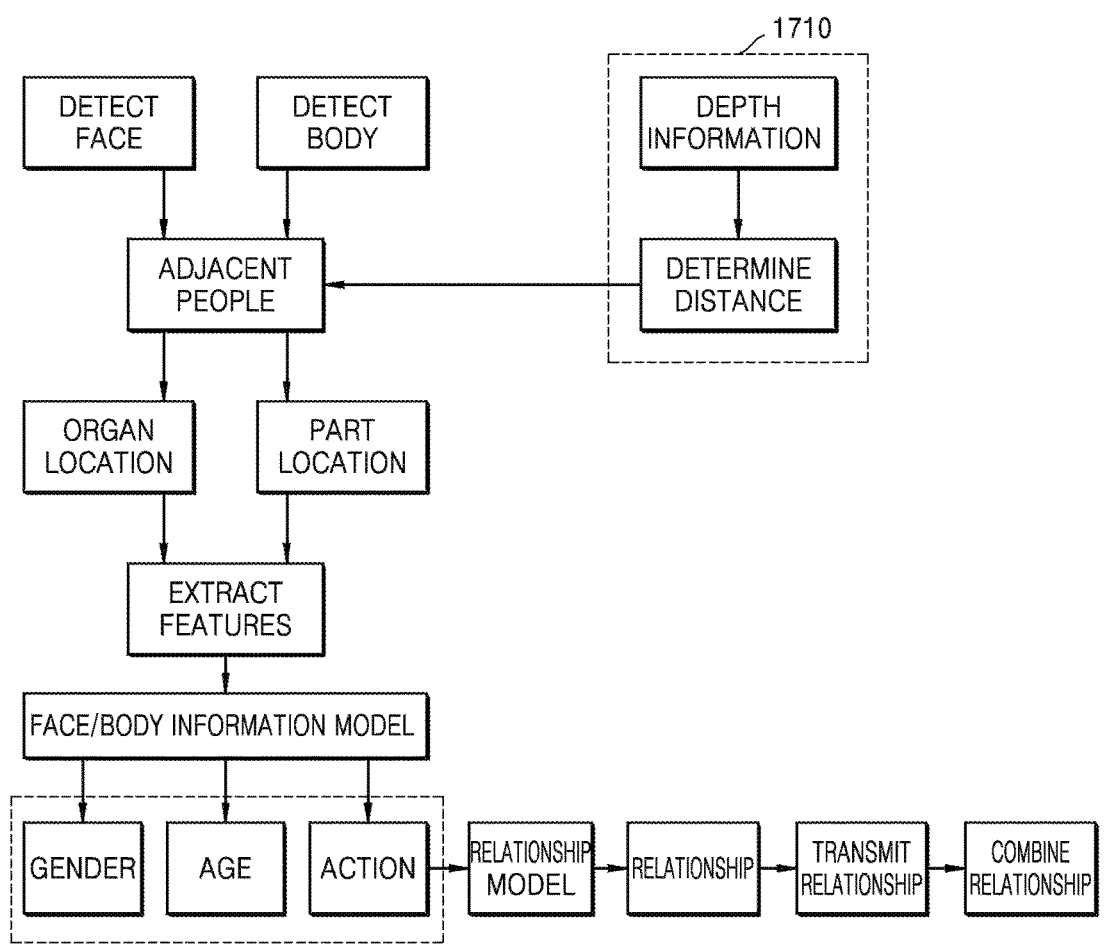
FIG. 17 is an exemplary diagram of determining relationship information.

FIG. 17 is an exemplary diagram of determining relationship information. The device 100 determines relationship information between bodies by combining a feature relationship matching list according to at least one selected from the body feature information, the voice feature information, or the physiological feature information.

The relationship information includes social relationship information and general personal information. The social relationship information includes family, friends, and colleagues. "Family" includes parents and children, or grandparents and grandchildren. "Friends" include lovers or ordinary friends. "Colleagues" include peers, or superiors and subordinates. It may be determined that there is no relationship between the bodies.

The general personal information includes gender, age, skin color, hairstyle, clothing, body shapes, facial accessories, and carried items. According to an embodiment, the feature relationship matching list includes relationship information between bodies which corresponds to at least one selected from body feature information, voice feature information, physiological feature information, and a combination thereof. For example, when two people are 20 to 30 years old, one is a man and the other is a female, a left and right distance between the two people is less than a predetermined left and right distance threshold of 100 cm, and a behavior is equal to holding hands, this corresponds to the two people being lovers. As another example, when two people are a middle-aged woman and a young girl holding hands, this corresponds to the two people being mother and daughter. As another example, when two people are an old man and a young boy holding hands, this corresponds to the two people being a grandfather and a grandson.

For example, as shown in FIG. 17, first, a front and back distance and a left and right distance between face detection windows and body detection windows of two adjacent people are calculated according to image information, the locations of the face detection windows obtained by using the face window detection method shown in FIG. 4 and the locations of the body detection windows obtained by using the body window detection method shown in FIG. 9, the number of faces, and the number of bodies.

In operation 1710, the device 100 determines a distance between people. A process of calculating the distance between people is as follows. A difference between distances from each person to the display 110 is calculated according to the depth information, and the difference is a front and back distance between two people. The left and right distance is calculated as follows. Based on a proportional relationship between image pixels and centimeters, an actual left and right distance of the two people in centimeters is calculated and determined according to a space of pixels between body detection boxes of the two people shown by using a visible light image. When the back and front distance between the two people obtained according to the image information is 80 cm, i.e., less than a predetermined front and back distance of 100 cm, and the left and right distance is 70 cm, i.e., less than a predetermined left and right distance of 100 cm, a relationship between the two people is determined as a social relationship information of the two people belonging to a close relationship. Also, as shown in FIG. 10, finding locations of body parts is performed on the two people to determine location information of body parts of the two people. In order to determine behavior information of the two people, such as hugging shoulders, location information of the body parts of the two people is determined by using the method shown in FIG. 10. Next, facial expressions, ages, genders, and skin colors obtained by using the method of FIG. 6 are combined, and thus, a social relationship of the two people is determined. For example, when two people are a male and a female in ages higher 10 to less than 40 that are hugging, a social relationship of the two people is determined as lovers.

According to an embodiment, by determining relationship information between at least one selected from body feature information, voice feature information, and physiological feature information, i.e., relationship information between various people from multiple viewpoints, accuracy of determining relationship information is greatly improved, and it is strongly guaranteed to push advertisements that correspond to various people.

After a social or familial relationship between two people is determined, when there are three or more adjacent viewers, the relationship is transmitted and merged to define a relationship between many people. When it is determined that one person is related to two adjacent people, for example, a child has a father-child relationship and a mother-child relationship respectively with an adjacent adult male and an adjacent adult female, the two adults other than the child may be determined as husband and wife. That is, the father-child relationship and the mother-child relationship may be merged into a family of three.

Figure 18:
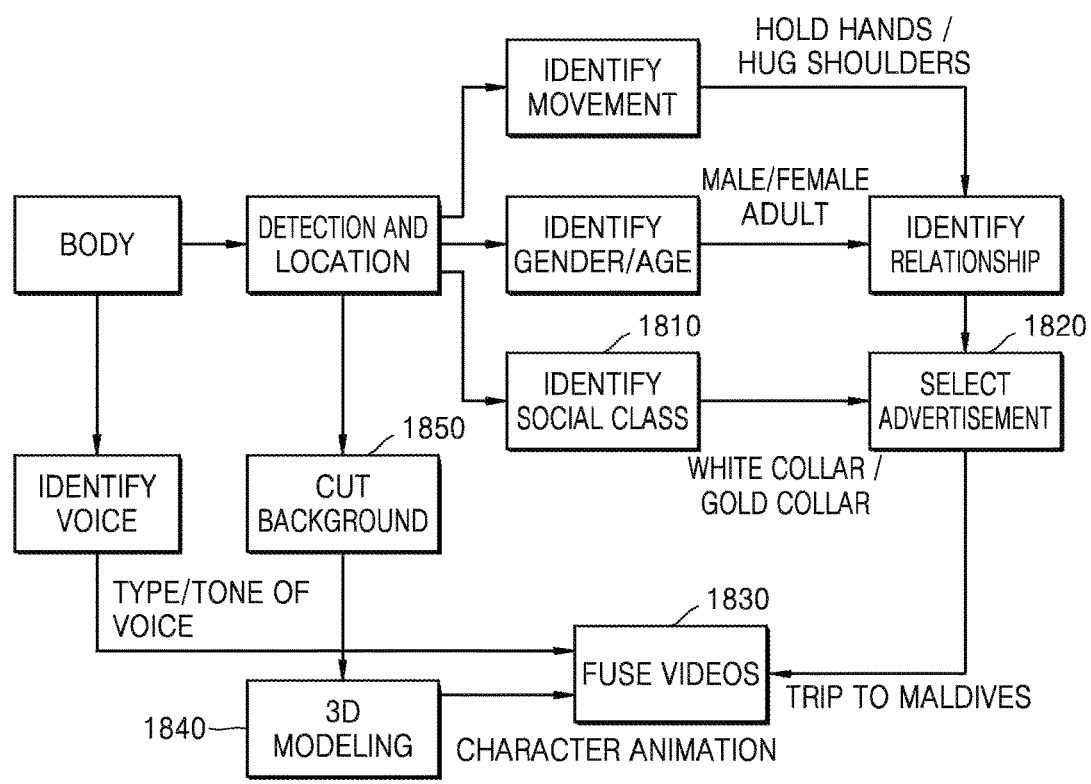
FIG. 18 is an exemplary diagram of generating a fused advertisement image.

FIG. 18 is an exemplary diagram of generating a fused advertisement image.

In operation 1810, the device 100 performs class identification according to body feature information, voice feature information, and physiological feature information to determine social classes of at least two viewers. Specifically, the device 100 performs class identification according to facial organs, accessories near facial organs, clothing, carried items, and voices to determine the social classes of the at least two viewers. The social classes mainly include blue collar class, white collar class, and gold collar class.

When extracting relationship between various groups, the device 100 selects the relationship based on a predetermined selection rules. The relationship is selected based on at least one selected from the following selection rules:

1. Select a social relationship among various relationship groups
2. Select relationship that involves a maximum number of people from among the various relationship groups
3. Select relationship between at least two people in a predetermined social class from among the various relationship groups
4. Select relationship between at least two people that are nearest to the display 110 from among the various relationship groups Selectively, the predetermined selection rules may be different weights. A selection rule with the highest weight is used as a selection rule.

For example, from among a plurality of groups of a relationship between two people, when a social relationship of two people show that they are lovers, and general personal information show that the two people have medium body size and in ages 20 to 30, "lovers" is selected as a relationship of the two people. When a "lover" group of two people "lovers" and three "family" groups of six people are in front of a screen, a relationship related to the maximum number of people, i.e., "family," is selected as the relationship. From among ten people are in front of a screen, when two people are lovers that are nearest to the screen, "lovers" is selected. When there are two groups of "lovers" and two groups of "family," each group including four people, "family" with four people in the gold collar class is selected.

In operation 1820, according to the relationship information, the device 100 automatically selects advertisements that correspond to the relationship information. Specifically, the device 100 performs a match query in a relationship matching list according to the relationship information to determine a type of the advertisements corresponding to the relationship information, and extracts advertisements from an advertisement library according to the type of the advertisements. For example, the device 100 performs a match query in a relationship matching list based on a relationship "lovers," determines that a matching advertisement type is wedding related advertisements, and extracts honeymoon advertisements from an advertisement library based on "lovers". As another example, the device 100 performs a match query in a relationship matching list based on a relationship "infants and mothers," determines that a matching advertisement type is advertisements for "infants and mothers," and extracts paper diaper advertisements from the advertisement library based on "infants and mothers." As another example, the device 100 performs a match query in a relationship matching list based on general personal information "female," determines that a matching type of advertisements includes cosmetic advertisements, and extracts facial mask advertisements from the advertisement library based on the cosmetic advertisements.

Based on relationship information, the device 100 selects advertisements that correspond to the relationship information along with current time information. For example, when the current time is a predetermined dining time, e.g., noon, the device 100 may select advertisements of western style restaurants for "lovers," and select advertisements of parent-child specific restaurants for "family."

In operation 1830, the device 100 automatically selects advertisements that correspond to the relationship information, performs role matching in the selected advertisements based on the relationship information to determine character roles of at least two people in the selected advertisements, and fuses the selected advertisements with the character roles to acquire fused advertisements.

In operation 1840, the device 100 establishes 3D face/body models of at least two people by performing 3D modeling.

The device 100 extracts tone information of at least two people from the voice information, and synthesizes reestablished voice information of the selected advertisement information by performing voice synthesis. Features of facial organs are extracted from image information. Voice source of the voice information is found by using a mouth shape according to a language type and voice content, along with a mouth shape feature included in the features of the facial organs. Frequency and tone of a voice are detected from voice information of a found person, and then matched with a pre-trained model to form a type of voice, and the voice is simulated to form a type of voice, and a human voice is simulated by using the type of voice. The device 100 fuses the 3D face/body model, the reestablished voice information, and the selected advertisements so as to acquire fused advertisements.

In operation 1850, background cutting is performed by using a graphcut algorithm according to not only body identification and body part locations of people, but also face identification, and facial organ locations.

3D image modeling is performed by head pose estimation and RBF conversion. For example, real-time face region detection is perform by using RLAB and Adaboost, facial organ feature search is performed by an SDM, and single face image modeling is performed by head pose estimation and RBF conversion. Also, body boxes are determined by a HOG and a DPM, body cutting is additionally performed graphcut, and body region images are mapped to a 3D model.

The 3D body model is a uniform preset model. The cut body region images are texture-mapped to the 3D model to achieve similar results. The voice information of the at least two people extracted from the voice information is synthesized into the reestablished voice information of the selected advertisements. Based on content and scenes of the selected advertisements, the established model, the reestablished information and the scenes of the advertisements are fused to acquire letter-fused advertisements.

For example, as shown in FIG. 18, the device 100 collects feature information of two people in front of a display screen, such as behavior information, gender information, and age information, and determines that relationship information between the two people is "lovers" based on the feature information. Based on a predetermined advertisement selection strategy, the device 100 selects a tour package "Romantic Journey in Maldives" according to a combination of the relationship information "lovers" and a social class of the two people. Roles of advertisements are selected according to the relationship information "lovers," character voice information in the advertisements is generated by imitating tones of the two people by using voice identification technology, and virtual models and character voice information of the two people are put into an advertisement video by using face modeling and body modeling technologies to thus generate a fused advertisements video.

According to an exemplary embodiment, by fusing models of at least two people in front of the display 110 and pushing advertisements, an immersion effect of videos is obtained, and it may be favorably guaranteed to obtain good advertisement push effect after playing a fused advertisement. Also, viewers will obtain immersive experience after watching the fused advertisements, and become participants of advertisement content from a third-party's perspective. Accordingly, the viewers may feel more related to the advertisements, and thus a push effect of the advertisements is improved.

After playing corresponding advertisements on the display 110, the device 100 obtains feedback related information of the at least two people with respect to the played advertisements. Based on a predetermined degree of satisfaction calculation method, the device 100 determines a degree of satisfaction of the at least two people with respect to the advertisements according to the feedback related information. The device 100 may compare the degree of satisfaction with a predetermined degree of satisfaction threshold, and replaces the advertisements when the degree of satisfaction is lower than the predetermined degree of satisfaction threshold according to the comparison result. The feedback related information includes a viewpoint direction, facial expression information, and voice content information. A method of calculating the degree of satisfaction includes three factors, i.e., a concentration point, facial expression, and concentration time. The concentration point determines a name of a product that is watched, the concentration time refers to a length of watching time, and the facial expression refers to an expression of a viewer that is watching the product. A degree of satisfaction query table may be preset based on the three factors. For example, when the product is milk powder, the concentration time is 10 seconds to 12 seconds, and the facial expression is smiling, a matching degree of satisfaction is determined as 0.5 by querying the degree of satisfaction query table. When a predetermined degree of satisfaction threshold is 0.7, a person may be determined as being dissatisfied with a milk power advertisement and the advertisement may be replaced.

Specifically, according to the viewpoint information viewpoint remaining time of the at least two people which is calculated and determined as shown in FIG. 7, the facial expression acquired as shown in FIG. 6, and the voice information acquired as shown in FIG. 5, degrees of satisfaction of viewers with respect to advertisements are determined based on a predetermined method of calculating a degree of satisfaction. When the degrees of satisfaction are lower than a predetermined degree of satisfaction threshold, the advertisements are replaced with advertisements of a type corresponding to identical relationship information, advertisements corresponding to different advertisements types corresponding to identical relationship information, or advertisement information corresponding to the different relationship information.

For example, the device 100 selects a milk powder advertisement according to "infants and mothers." When expression information of viewers obtained based on the method shown in FIG. 6 is smiling, viewpoint information determined by calculating according to the method shown in FIG. 7 corresponds to name information of the milk powder in the milk powder advertisement. Also, duration of the viewpoint remaining on the screen is 12 seconds, which is greater than a predetermined remaining time of 10 seconds, and the degree of satisfaction of the viewer with respect to the advertisement is 0.8, which is greater than the predetermined degree of satisfaction threshold of 0.7 seconds.

The device 100 repeats obtaining feedback of viewers, calculating the degree of satisfaction, and comparing the degree of satisfaction with the predetermined degree of satisfaction threshold until the degree of satisfaction is greater than the predetermined degree of satisfaction threshold.

When the number of advertisement replacement is greater than a predetermined replacement threshold, the device 100 re-extracts relationship information of the at least two viewers. The device 100 reselects advertisements that correspond to the relationship information according to the replaced relationship information.

By continuously replacing the advertisements according to the degree of satisfaction, advertisements that have highest matching degrees to the interest of a viewer may be played and shown to the viewer, and thus, push effects of the advertisements may be improved.

As another example, the device 100 selects a milk powder advertisement according to "infants and mothers." When viewpoint information of eyes that is determined by calculating based on the method of FIG. 7 indicates that the viewpoint is not focused on any location on the advertisement and the duration of the viewpoint remaining on the screen is 3 seconds, which is lower than a predetermined remaining time of 10 seconds, then, the degree of satisfaction of the viewer with respect to the advertisement is 0.1, which is lower than the predetermined degree of satisfaction threshold of 0.7. Accordingly, the advertisement may be replaced with a toy advertisement that matches with the relationship "infants and mothers."

Figure 19:
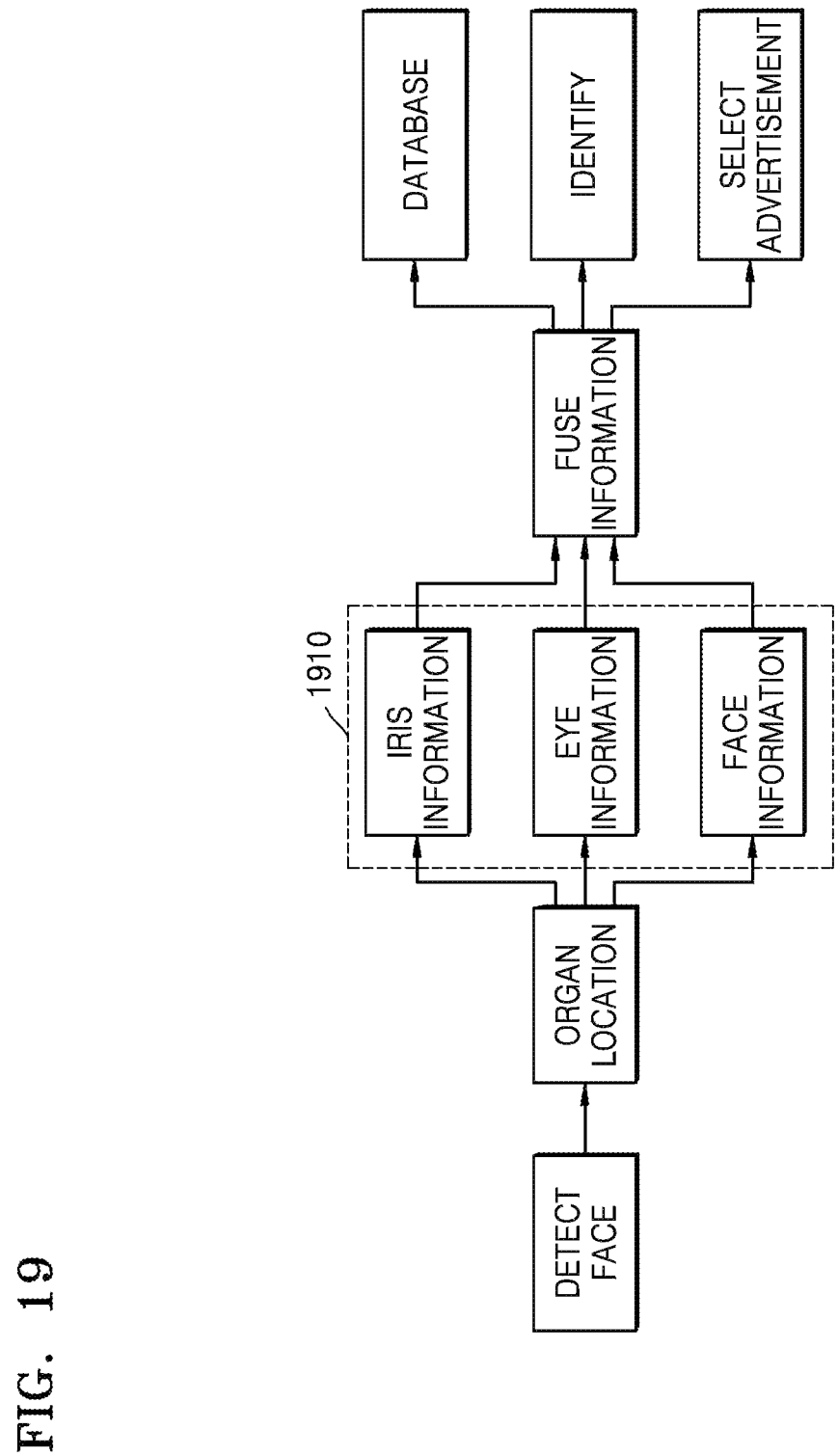
FIG. 19 is an exemplary diagram of identifying.

FIG. 19 is FIG. 19 is an exemplary diagram of identifying. The device 100 identifies the at least two viewers. The device 100 inquires play history information according to identification information to determine a past degree of satisfaction with respect to a type of currently played advertisement that is being watched by any one of the at least two viewers. When the past degrees of satisfaction are lower than the predetermined degree of satisfaction threshold, the device 100 replaces the advertisement.

In operation 1910, the device 100 extracts texture information of eye pupil iris, a region around the eyes, and an entire face image of the at least two viewers, and matching is performed to the extracted texture information and stored facial texture information with a single ID. When the matching has failed, it is determined that a person does not have the ID. Then, the ID is distributed to that person, and the ID and the texture information is recorded to a corresponding information base. When the matching is successful, a query is performed in the play history information according to the ID to identify a past degree of satisfaction with respect to the type of the currently played advertisement that had been watched by any one of the at least two viewers. When the past degree of satisfaction is lower than the predetermined degree of satisfaction threshold according to the comparison result, the advertisement is replaced. The play history information includes the ID information, and information corresponding to types of advertisements and past degrees of satisfaction of advertisements played in the past.

The device 100 updates the play history information. Specifically, the ID information of any one of the two viewers, the advertisement currently played to the person, and the degree of satisfaction with respect to the advertisement are used as a piece of data that is written into the play history information.

Based on collected data, the device 100 according to an exemplary embodiment may play advertisements that are necessary for viewers that are currently watching advertisements.

The device 100 according to an exemplary embodiment may estimate a relationship between viewers based on images of the viewers and voices of the viewers, and select and play advertisements according to the relationship of the viewers.

Exemplary embodiments have been described with reference to the accompanying drawings, and it will be understood that various modifications and amendments may be made without departing from the scope of the exemplary embodiments as recited in the following claims.

The device described herein may include a processor, a memory for storing program data and executing it, a permanent storage unit such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributive manner. This media can be read by the computer, stored in the memory, and executed by the processor.

The inventive concept may be described in terms of functional block components and various processing steps. Such functional blocks may be realized by any number of hardware and/or software components configured to perform the specified functions. For example, the inventive concept may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the inventive concept may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the inventive concept could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

The particular implementations shown and described herein are illustrative examples of the inventive concept and are not intended to otherwise limit the scope of the inventive concept in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of the terms "a," "an," and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The inventive concept is not limited to the described order of the steps. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope.

What is claimed is:

1. A method of playing advertisements on a display device including a camera and a depth sensor, the method comprising:
generating a first detection box corresponding to a first viewer and a second detection box corresponding to a second viewer, based on image data obtained via the camera;
collecting data of the first viewer and the second viewer based on the image data obtained via the camera;
determining a first distance between the first viewer and the display device via the depth sensor;
determining a second distance between the second viewer and the display device via the depth sensor;
determining a third distance between the first viewer and the second viewer based on a difference between the first distance and the second distance;
determining a fourth distance between the first viewer and the second viewer based on the first detection box and the second detection box;
determining relationship information of the first viewer and the second viewer based on the data, the third distance and the fourth distance; and
displaying advertisements determined according to the relationship information on the display device.

2. The method of claim 1, wherein the camera comprises at least one selected from a visible light camera, and an infrared camera.

3. The method of claim 1, wherein the determining of the relationship information comprises extracting body features of the first viewer and the second viewer from the data, and
wherein the body features of the first viewer and the second viewer comprise at least one selected from face features of the first viewer and the second viewer, and body related information of the first viewer and the second viewer.

4. The method of claim 3, wherein the face features of the first viewer and the second viewer comprise at least one selected from the number of faces, features of the facial organs, face skin color, age, gender, viewpoints, and facial accessories.

5. The method of claim 3, wherein the body related information of the first viewer and the second viewer comprises at least one selected from the number of bodies, features of body parts, movements of the bodies, hairstyle, clothing, body shapes, and carried items.

6. The method of claim 1, further comprising storing personal information of the first viewer and the second viewer in advance, and
wherein the determining of the relationship information comprises:
searching for personal information that matches with the data from among the personal information; and
extracting, based on the personal information that matches with the data, the relationship information between the first viewer and the second viewer.

7. The method of claim 1, wherein the determining of the relationship information comprises determining whether a relationship between the first viewer and the second viewer is family, friends, or colleagues.

8. The method of claim 1, wherein the determining of the relationship information comprises extracting at least one piece of information from gender, age, skin color, hairstyle, clothing, body shapes, facial accessories, and carried items of the first viewer and the second viewer.

9. A device for playing advertisements, the device comprising:
a display device;
an input interface comprising a camera and a depth sensor; and
at least one processor configured to:
generate a first detection box corresponding to a first viewer and a second detection box corresponding to a second viewer based on image data obtained via the camera,
collect data of the first viewer and the second viewer based on the image data obtained via the camera,
determine a first distance between the first viewer and the display device via the depth sensor,
determine a second distance between the second viewer and the display device via the depth sensor,
determine a third distance between the first viewer and the second viewer based on a difference between the first distance and the second distance,
determine a fourth distance between the first viewer and the second viewer based on the first detection box and the second detection box,
determining relationship information of the first viewer and the second viewer based on the data of the first viewer and the second viewer, the third distance and the fourth distance, and
control the display device to display advertisements determined according to the relationship information.

10. The device of claim 9, wherein the camera comprises at least one selected from a visible light camera, and an infrared camera.

11. The device of claim 9, wherein the at least one processor is further configured to extract body features of the first viewer and the second viewer from the data, and determine advertisements to play based on the body features, and
wherein the body features of the first viewer and the second viewer comprise at least one selected from a distance between the first viewer and the second viewer, face features of the first viewer and the second viewer, and body related information of the first viewer and the second viewer.

12. The device of claim 9, further comprising a memory configured to store personal information of the first viewer and the second viewer in advance, and
wherein the at least one processor is further configured to search for personal information that matches with the data from among the personal information, and extract the relationship information between the first viewer and the second viewer based on the personal information that matches the data.

13. The device of claim 9, wherein the input interface further comprises a microphone, and
wherein the at least one processor is further configured to:
collect sound information via the microphone, and
determine the relationship information of the first viewer and the second viewer based on the data of the first viewer and the second viewer, the third distance, the fourth distance and the sound information.

14. The device of claim 13, wherein the at least one processor is further configured to:
identify a threshold value,
identify the sound information as voice information based on a power level a converted power spectrum signal of the sound information exceeding the threshold value,
identify the sound information as noise information based on the power level the converted power spectrum signal of the sound information being less than the threshold value, and
filter the noise information from the sound information used to determine the relationship information of the first viewer and the second viewer.

15. The device of claim 14, wherein the at least one processor is further configured to identify the power level of the converted power spectrum signal of the sound information using a fast Fourier Transform.

16. The device of claim 9, wherein the at least one processor is further configured to:
extract body features of the first viewer and the second viewer from the image data, and
determine the relationship information of the first viewer and the second viewer based on the data of the first viewer and the second viewer, the third distance, the fourth distance and the body features.

17. The device of claim 16, wherein the at least one processor is further configured to:
identify a first direction corresponding to a first viewpoint of the first viewer,
identify a second direction corresponding to a second viewpoint of the second viewer, and
identify the body features of the first viewer and the second viewer based on the first direction and the second direction.

18. The device of claim 17, wherein the at least one processor is further configured to:
identify the first direction by mapping an average 3D face model onto the first detection box and comparing the first detection box with the average 3D face model, and
identify the second direction by mapping the average 3D face model onto the second detection box and comparing the second detection box with the average 3D face model.

19. The device of claim 18, wherein the at least one processor is further configured to:
identify first facial features of the first viewer and second facial features of the second viewer based on a machine learning algorithm,
identify the first direction based on the first facial features, and
identify the second direction based on the second facial features.

20. A non-transitory computer-readable recording medium having recorded thereon a program, which, when executed by a computer including a display device, a camera and a depth sensor, performs a method including:
generating a first detection box corresponding to a first viewer and a second detection box corresponding to a second viewer, based on image data obtained via the camera;
collecting data of the first viewer and the second viewer based on the image data obtained via the camera;
determining a first distance between the first viewer and the display device via the depth sensor;
determining a second distance between the second viewer and the display device via the depth sensor;
determining a third distance between the first viewer and the second viewer based on a difference between the first distance and the second distance;
determining a fourth distance between the first viewer and the second viewer based on the first detection box and the second detection box;

determining relationship information of the first viewer and the second viewer based on the data, the third distance and the fourth distance; and displaying advertisements determined according to the relationship information on the display device.

* * * * *